United States Patent [19]

Klein

[11] Patent Number: 4,710,520

[45] Date of Patent: Dec. 1, 1987

[54] MICA-POLYMER MICRO-BITS COMPOSITION AND PROCESS

[76] Inventor: Max Klein, P.O. Box 3, Dalton, Mass. 01226

[21] Appl. No.: 858,942

[22] Filed: May 2, 1986

[51] Int. Cl.$^4$ ................................................ C08J 9/00
[52] U.S. Cl. ........................................ 521/55; 55/524; 55/527; 428/283; 428/290; 521/54; 521/82; 521/91; 521/92; 521/918; 524/449
[58] Field of Search .................... 524/449; 521/54, 55, 521/82, 91, 92, 918; 428/283, 290; 55/524, 527

[56] References Cited

U.S. PATENT DOCUMENTS

| 4,200,679 | 4/1980 | Klein | 521/918 |
|---|---|---|---|
| 4,207,378 | 6/1980 | Klein | 521/918 |
| 4,560,818 | 3/1987 | Oka et al. | 524/449 |
| 4,576,856 | 3/1986 | Kuwajima et al. | 524/449 |
| 4,590,123 | 5/1986 | Hashimoto et al. | 524/449 |
| 4,652,602 | 3/1987 | Liu | 524/449 |

*Primary Examiner*—Morton Foelak
*Attorney, Agent, or Firm*—Dann, Dorfman, Herrell, and Skillman

[57] ABSTRACT

A high temperature filter material, comprising a nonwoven glass fiber matrix including mica particles, polymer micro-bits and a uniformly distributed binder system, is made by a wet laid procedure, as used in papermaking. A composition comprising the mica particles and polymer micro-bits, used in making the filter material, and a method of preparing the composition are also disclosed.

18 Claims, No Drawings

MICA-POLYMER MICRO-BITS COMPOSITION AND PROCESS

BACKGROUND OF THE INVENTION

The present invention relates to a glass-fiber filter material for use in high temperature environments, to a composition which imparts heat resistance to the filter material and to a process for making the composition.

High temperature filters are used extensively in the automotive industry to filter heated air from paint drying ovens on automobile assembly lines. These filters permit the recycling of high temperature air for use in the paint drying process, without compromising the exterior finish of the automobiles.

The high temperature, glass-fiber filter materials currently being supplied to the automotive industry are generally rated at 450° F. for continuous operation. If used at high temperatures, the glass fibers tend to become embrittled and fragile, thus risking possible breakthrough of unfiltered air, with obvious adverse consequences on the automobile painting operation. Moreover, the manufacture of these prior art high temperature filter materials often involves the use of costly, and sometimes potentially hazardous substances, as well as complex production procedures.

Accordingly, a need exists for a high temperature filter material which possesses satisfactory strength and filtration efficiency at temperatures in excess of 450° F., and which may be produced at reasonable cost.

SUMMARY OF THE INVENTION

There has now been discovered, in accordance with the present invention, a glass-fiber filter material suitable for air filtration at elevated temperatures, well in excess of 450° F., which may be conveniently prepared using conventional paper-making technology.

According to one aspect of the present invention, there is provided a high temperature filter material in the form of a non-woven glass fiber matrix, including processed mica particles, the majority of which are of a size below 40 microns, together with a particulate polymeric material, referred to herein as polymer micro-bits, which will be described in detail hereinbelow. Uniformly distributed throughout the matrix is a compatible binder system, comprising an organic binding agent, which is insoluble in cold water and soluble in hot water and which retains its binding action upon cooling, for binding the points of contact of the fibrous and particulate components of the filter material, and a film-forming siloxane polymer, for aiding in the retention of the particular components in the filter material.

The processed mica particles provide a high temperature resistant coating on the glass fibers, allowing the filter material to be used for filtering gas streams significantly hotter than was previously possible, using the above-mentioned prior art glass fiber filter materials. This high temperature filter material contributes to more efficient automobile painting operations, by making it possible to increase the drying rate. In addition, it is anticipated that the filter material of this invention may be utilized for cleaning exhaust gases from industrial smoke stacks, thereby enabling the heated gas stream to be recycled through a heat exchanger, for recovery of a substantial portion of the heat content thereof.

According to another aspect of this invention, there is provided an aqueous dispersion, the disperse phase of which includes glass fiber, mica, polymer micro-bits and the above-mentioned binder system components, and which is used as the furnish for the preparation of the high temperature filter material, by means of a wet-laid procedure using conventional paper-making technology.

According to still another aspect of the present invention, there is provided a composition of matter, useful as a component of the above-described filter material, which composition comprises a mixture of mica particles, a majority of which are of a size below 40 microns, and the above-mentioned polymer micro-bits.

According to a further aspect of the present invention, there is provided a process for preparing the above-mentioned composition, which essentially involves processing mica particles having a average size of 40 microns, or greater, in the presence of the polymer micro-bits, to produce mica particles of reduced particle size suitable for use in the present invention. Other aspects and advantages of this invention will be apparent to those skilled in the art upon reading the following detailed description thereof.

DETAILED DESCRIPTION OF THE INVENTION

The specific combination of components used in making the high temperature filter material of this invention results in a material having a number of desirable properties, including heat resistance at temperatures as high as 750° F., high strength, efficiency for particulate removal in the DOP (diocyte phthalate) test of above 40%, and a resistence to air flow of about 3 to about 10 mm differential pressure ($\Delta P$). These characteristics make the filter material well suited for a variety of high temperature air filtration applications.

The principal components of the high temperature filter material are glass fiber, mica particles, polymer micro-bits, and a compatible binder system, comprising a hot water-soluble organic binding agent and a film-forming siloxane polymer. When in use, the combustible components are dissipated by exposure to high temperatures, without compromising the strength, efficiency or resistance of the filter material. Additional substances, such as various processing aids, are useful in the production of the filter material, but are not present in appreciable amounts in the final product, nor are such substances essential in order for the filter material to perform its intended function.

The specific proportions of the different components of the high temperature filter material are subject to reasonable variation, inasmuch as a change in the relative amounts of certain components may determine the respective possible minimum and maximum amounts of other components. Moreover, when one component of the filter material is replaced by another component of the same general type, the replacement component may not necessarily be equivalent to the replaced component, on a quantitative bases, insofar as function is concerned. Accordingly, the following description of the composition of high temperature filter material is, of necessity, set forth primarily in functional terms.

Chopped glass fibers ranging in size from about 0.02 cm. to about 1.3 cm. in length and from about 0.5 microns to about 15 microns in diameter are preferred for making the filter material of the present invention. The appropriate amount of glass fiber to be used depends on the tensile strength, efficiency and resistance required for environment in which the material is to be used.

Generally, glass fiber makes up about 50% to about 70%, by weight of the filter material. In a presently preferred formulation, exemplified below, the glass fiber component constitutes about 55% to 60%, by weight. Fine diameter glass fibers are preferred in order to optimize filtration of sub-micron sized particulate matter. Fiber blends including so-called glass microfibers have been found to be particularly effective. A suitable glass fiber blend comprises, by weight: (a) about 27–28 parts of fibers of random length, generally within the above-stated range, and about 3 microns in diameter (Evans 4100C); (b) about 15–18 parts of random length fibers, and 0.6 microns in diameter (Manville Corp. Code 106); (c) about 12–15 parts of fibers about 1.27 cm. in length and about 13.5 microns in diameter (Owens-Corning Fiberglass K-$\frac{1}{2}$"–685); and (d) about 40–42 parts of fibers about 0.635 cm. in length and about 6.5 microns in diameter (PPG DE-610-$\frac{1}{4}$"). Of course, glass fibers of corresponding size and quality from any source may be used.

The mica particles are employed in an amount effective to coat the glass fibers of the matrix adequately to provide the required tensile strength at 750° F. Generally, the mica content may range from about 10% to about 30%, by weight of the filter material. A filter material displaying good overall qualities for a product of this type has been obtained, having a mica content of approximately 25%, by weight.

As previously noted, a majority of the mica particles used in the high temperature filter material are of a particle size below 40 microns. In this regard, it has been found that when mica particles having an average particle size of about 40 microns, or greater, are incorporated into the filter material as is, i.e. without further processing for size reduction, the resultant filter material exhibits an undesirably high resistance to air flow. This is believed to be due to the deposition of mica particles on the glass fibers, resulting in a reduction of the effective pore size of the glass fiber matrix. Such high resistance to air flow occurs even when relatively low concentrations of mica particles are employed, e.g. on the order of 1% to 10%. Moreover, filter material made from the unprocessed mica did not have the desired efficiency, or the tensile strength required to perform satisfactorily at 750° F. On the other hand, it has been found that when attempts are made to reduce the size of the mica particles below an average particle size of 40 microns, using standard grinding or milling techniques, a fine powder is obtained, which is unacceptable for a high temperature filter material of the type described herein. Experience has shown that the powdered mica is not uniformly retained in the glass fiber matrix during the wet-laid forming operation, because it is either washed out of the matrix, or because localized dense packing of the powdered mica particles occurs, causing increased resistance. Thus, the mica particles used in the high temperature filter material of the present invention must be small enough to surround and coat a significant amount of the glass fiber surfaces, yet large enough so that a significant amount of mica resists dislodgement from the glass fiber matrix, during production of the filter material.

However, when mica particles having an average particle size of 40 microns, or greater, are comminuted in the presence of the above-mentioned polymer micro-bits under appropriate conditions, as described below, a majority of the resultant mica particles is reduced to a particle size below 40 microns, but not to a fine powder.

The size distribution of the resultant mica particles is appropriate for deposition of the particles over a substantial portion of the surface area of the glass fibers. It is believed that the aspect ratio, i.e. the particle length or breadth divided by thickness, of the comminuted mica particles is somewhat reduced, so that the level of air flow through the filter material is satisfactory, but not to the extent that the mica particles are lost from the filter material during production. The composition of mica particles and polymer micro-bits, processed as described herein, when combined with a suitable mix of glass fibers, yields a filter material that performs efficiently above the burn-off temperature of the organic components thereof.

The presence of polymer micro-bits in the filter material in conjunction with the size-reduced mica particles is believed to have a beneficial effect on the degree of resistance to air flow exhibited by the finished filter material. The presence of micro-bits in the filter material is thought to separate the individual glass fibers of the matrix, tending to increase the flow rate of air through the matrix. Conversely, when no micro-bits are included in the glass fiber matrix, the separations between individual glass fibers are apparently significantly smaller. The aggregate effect of the small spacing between glass fibers and the deposition of mica particles on the glass fibers, which further decreases the interfiber spacings, considerably increases the resistance of the matrix to air flow. A similar effect has been observed when other plate-like mineral substances, such as vermiculite, are attempted to be used to impart heat resistance to a glass-fiber based filter material. Accordingly, the presence of polymer micro-bits in the glass fiber matrix improves the level of air flow through the filter material.

Given the demonstrated small particle-holding capacity of the thermoplastic polymer micro-bits in various filter paper formulations, it is likely that a substantial amount of the comminuted mica particles is carried within the folds and creases of the individual micro-bit particles. It is postulated, therefore, that when the organic components of the filter material are burned off at the high temperatures encountered in use, these mica particles tend to become deposited on the glass fiber surfaces, thus providing enhanced heat resistance.

Any of the commercially available, chemically-inert micas, whether natural (phlogopite, muscovite, pegmatite) or synthetic, may be used in the practice of the present invention. Satisfactory results have been obtained with a phlogopite mica sold under the name Suzorite ® by Marietta Resources International, Ltd., Hunt Valley, Md.

Size reduction of the mica particles in the presence of polymer micro-bits is conveniently carried out using commercial grinding equipment. Particularly good results have been obtained using an Attritor ® 200-S batch grinder, available from Union Process, Akron, Ohio. The particular model used in producing the composition described herein has a tank capacity of 300 gallons and was powered by a 50 horse power motor.

Comminution of the mica particles in the presence of polymer micro-bits is carried out in an aqueous medium, which preferably contains a polyhydric alcohol or a polymeric derivative thereof, such as diethylene glycol. Glycerine may also be used if desired. The function of the polyhydric alcohol or polymeric derivative is to plasticize the finished filter material, rendering the material more flexible, and thereby reducing the tendency to crack or tear upon folding. The ratio of water to polyhydric alcohol or polymeric derivative thereof should be from about 5:1 to about 50:1.

The grinder charge comprising mica particles, polymer micro-bits and water may optionally include a portion of the organic binding agent for the filter material. Powdered polyvinyl alcohol has been used with good results.

A dispersion agent, such as colloidal silica may also be added to the grinder charge. The dispersion aid is used in an amount effective to promote uniform deposition of the mica particles on the glass fiber surfaces during production of the filter material. Generally, this amount will be less than about 0.2%, by weight, of the finished filter material. Colloidal silica has been particularly effective for this purpose.

The beneficial effect of the colloidal silica a evident from a visual examination of the finished filter material. Thus, when colloidal silica is used in making the filter material, the finished product has a distinct golden-brown color, which is characteristic of the mica component. In formulations in which no colloidal silica is present, this coloration was not so evident. Indeed, absence of visable mica in the drainage water from the production of the filter material exemplified below, tends to indicate that virtually all of the mica is retained in the finished product. It is believed that the colloidal silica improves the dispersion of the mica powder around the glass fibers, and perhaps serves as a small particle bridging agent to allow the relatively large mica particle (mean diameter of about 10 microns) to adhere uniformly around the fibers that may vary from about 0.5 microns to about 15 microns in diameter.

A microbicide may be added to the grinder charge, if desired, to prevent microbial degradation of polyvinyl alcohol and/or diethylene glycol, which may occur upon extended storage of the composition.

Processing mica in the grinding apparatus described above, under the above-stated conditions, yields mica of generally reduced particle size, the size distribution thereof being substantially between 1 micron and about 40 microns. It may be that such a relatively narrow particle size distribution range is important for achieving adequate coating of glass fibers having the range of diameters used in the formulations described herein. The calculated surface area of the comminuted mica particles is from 0.40 to 0.60 m$^2$/cc. The size distribution and calculated surface area measurements were made using a Microtrac Particle Size Analyzer (Leeds & Northrup Instruments, a unit of General Signal).

The aqueous slurry of mica particles, polymer micro-bits, organic binder and dispersion agent (when the latter two components are used) discharged from the grinder is used as such in the filter material formulation.

The polymer micro-bits used in making the filter material are produced from an expanded, non-brittle, thermoplastic polymer selected from the group of a styrene polymer, a lower polyolefin, i.e. the polymer of an ethylenically unsaturated hydrocarbon monomer having from 2 to 6 carbon atoms, or copolymers or blends of those polymers, or are produced from a flexible foamed polyurethane.

The polymer micro-bits are incorporated in the high temperature filter material in an amount effective for attaining the desired resistance to air flow of the filter material and for aiding in the retention and uniform distribution of the mica particles in the glass fiber matrix. The micro-bits also having a seemingly unique capability of preventing reduction of the mica particles to fine powder during comminution. Generally the filter material is comprised of about 2% to about 12%, by weight, of polymer micro-bits, 2% to 5%, being preferred.

Micro-bits of an expanded, non-brittle, thermoplastic styrene polymer or lower polyolefin are more fully described, along with their method of preparation, in my U.S. Pat. No. 4,207,378. These micro-bits may be broadly described as being (a) from about 40 to about 325 microns long and from about 20 to about 320 microns wide, (b) substantially completely free of intact cells of the expanded polymer from which they were produced, (c) substantially non-uniform in outline of the individual micro-bit particles, and (d) in density, at least 85% of the density of the specific unexpanded polymer from which the aforesaid expanded polymers are produced.

The polyurethane micro-bits and their preparation are more fully described in my U.S. Pat. No. 4,200,697.

The individual polyurethane micro-bit particles may be generally described as tripodal particles with generally uneven length legs and no uniformity in outline, the particles being broken and consisting of inter-connected strand portions from adjacent cells of the flexible foamed polyurethane. The strand portions are substantially free of intact cell windows and have hook-like projections with indentations and flutes. The uneven leg lengths and hook-like projections and flutes result from the destruction of the cell windows of the flexible polyurethane foam from which the polyurethane micro-bits are produced.

The entire disclosures of both of my aforesaid polymer micro-bits patents (U.S. Pat. Nos. 4,207,378 and 4,200,679) are incorporated in the present application by reference, as if actually set forth herein in full.

Thus, polymer micro-bits may be used in varying amounts to provide the filter material with the degree of porosity required for the specific application in which the material is to be used. In addition, the polymer micro-bits, being oleophilic in nature, are effective in removing various organic vapors from the air filtered therethrough. It is believed that the micro-bits also serve to some extent in retaining the particulate mica in the filter material. Polystyrene micro-bits, prepared as described in Example 1 of my U.S. Pat. No. 4,207,378 are particularly preferred in the filter material and composition of the present invention.

The filter material includes a binder system in an amount effective for substantially uniformly coating the various components of the filter material, so as to impart the degree of physical integrity required for wet lay production, as well as for the specific filtering application contemplated for the material. The binder system includes a binding agent which is insoluble in cold water, soluble in hot water, and retain its binding action upon cooling. A suitable organic binding agent satisfying these criteria is polyvinyl alcohol which is readily available from commercial sources. It is preferable for purposes of the present invention to use polyvinyl alcohol fibers to achieve uniform distribution thereof in the aqueous dispersion used in making the filter material. Polyvinyl alcohol is essentially insoluble in cold water but tends to quickly dissolve in water at temperatures above 140° F. and this property may be used to advantage during production of the high temperature sheet material. After the wet-laid material is removed from the support on which it is formed, it is subjected to elevated temperatures to dry the material, causing the polyvinyl alcohol fiber to soften, swell and solubilize in the water present in the material. The solubilized polyvinyl alcohol tends to flow to the points of contact between the fibrous and particulate components, and accumulate there so that as the material continues to be dried the solid polyvinyl alcohol comes out of solution and binds together the fibers and particulate components of the material on which it has become coated. Polyvinyl alcohol is very effective for retaining the mica particles in the filter material. Other forms of polyvinyl alcohol, e.g. powder, may also be used, if desired.

The level of polyvinyl alcohol addition may be used to control the tensile strength and stiffness of the matrix. The amount of organic binding agent normally present in the finished filter material may vary from about 2% to about 15%, by weight.

The binder system also includes a film-forming siloxane polymer in an amount effective for aiding in the retention of the particulate component during wet-lay production of the filter material and in use. It is believed that the siloxane polymer also contributes to the sustained tensile strength of the material at elevated temperatures. The amount of siloxane polymer present in the filter material is generally about 3% to about 11%, by weight of the filter material.

As used herein the term "siloxane polymer" refers to a linear chain structure of the general formula:

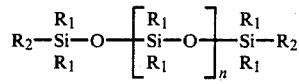

wherein $R_1$ is lower alkyl, preferably methyl and $R_2$ is lower alkyl or hydroxyl and n is equal to approximately 150. Also included with the term "siloxane polymer" are derivatives thereof substituted with various functional groups, such as aminoalkyl groups.

Good results have been obtained using siloxane polymer supplied by SUS Chemical Company Inc., under the trade name "Uscosoft ES". This product is a water-based emulsion of silicone polymers consisting of a mixture of polydimethylsiloxane polymers with terminal silanol reactivity and aminofunctional polydimethylsiloxane copolymers. The blend ratio is approximately 9 to 1. These polymers can be made to cross-link into an elastomeric film. Cross-linking is promoted by zinc stearate, which is employed as a water emulsion containing zinc stearate solids of approximately 25%. This promoter or catalyst is also available from SUS Chemical Co., Inc. under the designation Catalyst 232-A.

The preparation of different formulations of the filter material including the film-forming polysiloxane components has indicated that deposition of these emulsions on the fibrous and particulate components of the filter material may be pH controlled, rather than concentration dependent. It appears that deposition may be facilitated by adjusting the aqueous dispersion or furnish for making the filter material to a pH of about 4. Adjustment of the pH in this way appears to change the form of the polysiloxane emulsions to a non-emulsified and larger particle form, thereby improving the retention of the film-forming polysiloxane components and cross-linking agent in the filter material.

The siloxane polymer aids significantly in the release of the wet filter material from the support on which it is formed and, in conjunction with the organic binding agent, enhances particle retention during formation of the filter material and in use. The siloxane polymer also imparts softness, abrasion resistance and improved drape characteristics to the finished product.

The high temperature filter material of the present invention can be efficiently produced from an aqueous dispersion of the aforementioned components at relatively low cost, using conventional paper-making equipment and processes, as previously noted.

The aqueous dispersion used in making the composite material of the present invention is conveniently prepared in a standard paper-making beater or similar mixing apparatus. The mixing time should be sufficient for obtaining a uniform dispersion, which normally requires about 20 minutes, but may vary depending on the specific formulation of the dispersion or the type paper-making equipment used.

Various chemicals may be included in the aqueous dispersion as processing aids, in accordance with the practice in the art. These include, additives such as neutral dispersion aids, e.g. Lubrizol TM (ethoxylated vegetable oil), Katapol TM (polyoxyethylated alkylamine), a cold water defoamer, e.g. Defoamer SA-3 (blend of hydrocarbon oil-stearates and amides, available from Laurel Brand Products, Philadelphia, Pa.) and an emulsifiable microbicide, e.g. Busan ®30 (active ingredient: 2-(thiocyanomethylthio) benzothiazole, available from Buckman Laboratories, Inc., Memphis Tenn.). Those experienced in the art of paper-making can easily determine the appropriate amounts of these chemicals to add to a given dispersion.

The appropriate proportions of the different filter material components and the effect of varying the relative proportions of the different components on the performance characteristics of the filter material may be easily determined by making and testing hand sheet samples as is the common practice in the art.

Conversion of the aqueous dispersion, or furnish to the finished high temperature filter material may be readily accomplished using conventional flat, slant-wire or cylinder-type paper making apparatus, i.e. those equipped with fourdrinier wires, cylinder molds, or combined machines including both fourdrinier wires and cylinder molds. The process ordinarily involves thorough homogenization of the dispersion in a mixing chest to insure uniformity, application of the homogenized dispersion to a porous substrate (usually an endless belt) to form a wet web of the material, removal of the web from the porous substrate, followed by dewatering of the material.

Monitoring of the pH of the dispersion has revealed a tendency of the pH to increase during the course of the production process. This has a deleterious effect on the dispersion, as is evidenced by the formation of fiber clusters and apparent loss of mica. This difficulty may be overcome by adjusting the dispersion to a pH of about 4, by the addition of a strong acid, such as $H_2SO_4$. The dispersion should not be permitted to rise above a pH of 8 during production of the filter material.

The aqueous dispersion is diluted uniformly with water, to provide a furnish for the filter material having the desired consistency. The furnish in the head box should be continuously agitated in order to prevent separation of floatation of particulate components of the furnish. The furnish should be applied to the forming surface of the paper-making machine at a rate of about 50 to 130 gallons/minute for 1300 square feet of finished material, the exact rate depending on the drainage and drying capacity of the material, which depends, in turn, on its specific composition. Individual sheets may be made using an ordinary sheet mold.

The partially dewatered material is normally passed under an open flame, and then through a hot-air tunnel dryer followed by contact with high-pressure steam-heated drums. The temperature required for drying of the filter material is normally in the range of about 265° F. to about 475° F. The final water content of the web or sheet should be less than about 1.0%.

The following examples describe the invention in further detail, including the manner and process of making and using it, and set forth the best mode presently contemplated by the inventor for carrying out the invention.

EXAMPLE 1

Preparation of Mica/Polymer Micro-Bits Composition

The following components were charged in two substantially equal portions for processing, as separate batches, in the aforementioned Atrittor ® 200-S:

| Components | Weight (in Pounds) |
|---|---|
| Mica flake[a] | 700 |
| Polystyrene micro-bits[b] | 350 |
| Colloidal silica[c] | 5 |
| Polyvinyl alcohol powder | 140 |
| Diethylene glycol | 350 |
| Water | 1300 |

[a]Suzorite ® (phlogopite)
[b]Prepared according to Example 1 of U.S. Pat. No. 4,207,378 (20% solids)
[c]Cab-O-Sil (Cabot Corp. Boston, MA)

The Atrittor ® 200-S was operated at under 100 rpm for ½ to 1 hour, using 3/16 inch stainless steel balls as the grinding medium (total weight 40 pounds).

The first batch of comminuted mica particles had a size distribution between 3.13 and 35.5 microns and a calculated surface area of 0.52 m²/cc. The second batch had a particle size distribution between 2.21 and 35.5 and a calculated surface area of 0.56 m²/cc.

The processed composition was apportioned into 275 pound quantities for use in preparing the high temperature filter material.

EXAMPLE 2

Production of High Temperature Filter Material

The following is a listing of the various quantities of each component used in the furnish for an actual production run of the high temperature filter material of the present invention.

| Component | Quantity |
|---|---|
| Microbicide[h] | 25 ml. |
| Composition of Example 1 | 275 lbs. |
| 4100 C glass fiber | 50 lbs. |
| 106 glass micro-fibers | 30 lbs. |
| Dispersion aid[f] | 1000 ml. |
| Defoamer[g] | 300 ml. |
| K-⅛" - 685 | 25 lbs. |
| DE - 610¼" | 75 lbs. |
| Polyvinyl alcohol fiber | 16.5 lbs. |
| Siloxane polymer[d] | 22.5 lbs. (dry) |
| Cross-linking agent[e] | 2 lbs. (dry) |

[d]Uscasoft ES (30% solids emulsion)
[e]Catalyst 232-A (25% solids emulsion)
[f]Equal volumes of Lubrizol ™ and Katapol ™, the Lubrizol ™ being added first
[g]Defoamer SA-3
[h]Busan ® 30

The above furnish was prepared in a pulper containing 4000 gallon of water, with each ingredient being added in the order listed above. Three pulper loads were made and transferred to a beater chest. The beater chest content at the dispersed solids consistency of 1.5 percent, as a homogenous dispersion, was transferred to a machine chest. A machine chest is used in paper making to hold stock to be fed to the head box from which the furnish is then fed onto the forming surface of a paper-making machine.

The furnish was pumped from the machine chest to the head box by a stock pump which at 1170 rpms propelled the furnish past an electric in-line consistency sensor equipped to send a signal to a controller. The controller initiates a current to a pneumatic transducer which controls the dilution water value at the stock pump suction point to enable any needed dilution water to be supplied prior to passing another consistency sensor.

The furnish continued through an in-line magnetic flow meter associated with a magnetic current converter providing a signal to a controller which, by a current to an activator transduce, serves to activate a flow valve to regulated flow of the furnish to the fan pump box. The fan pump, operating at 1750 rpm, conveyed the furnish through a magnetic flow meter, similar to a gate flow meter, to a Rice Barton open head box.

The head box level was set at 15.5 inches and the boat or flow control baffle was set in the following configuration: horizontal 15.5 inches; toe 6.25 inches; heel 7.5 inches. Additional dilution water was introduced into the dispersion before entering the head box to maintain a uniform consistency. From there the slurry was passed under the head box slice bar, and was distributed in uniform spread and flow over the traveling Fourdrinier wire. The paper-making machine was a Uniflow Niagara DK-61M ultraplex Fourdrinier, with a wire having 155 strands per inch in the direction of travel and 95 strands per inch across. The wire was 64 inches wide.

The diluted dispersion was fed from the head box onto the wire of the Fourdrinier machine (30° slant), set at full deckle, and moving at a rate of 85 feet/minute, so as to provide a filter material which, after drying, had a basis weight of 18.1 and a caliper of 10–12 mil.

The furnish having a consistency of about 0.5% solids was applied to the forming wire at a rate of about 100 gallons/min., and exhibited good drainage at the wet end, rapid drying capacity and early development of adequate sheet tensile strength to permit easy removal from the forming wire. The drainage rate of white water was about 90 gallons/min. In addition to drainage through the screen, water was removed from the wet web by passing the screen over 6 Rice Barton friction boxes operated with the vacuums set as indicated below in inches of mercury: Box 1: 0"; Box 2: 3"; Box 3: 3"; Box 4: 6"; Box 5: 6"; and Box 6: 8". The furnish, now as a web about 50 percent dry, continued at the same speed of 80 feet per minute onto an endless belt conveyor, and after about 1.5 meters beyond the end of the wire passed about 10 centimeters below a gas fired heating panel known as a Marsden heater. The heat control setting on the Marsden heater was 12. The temperature of the ceramic radiating surface was 2100° F. The exposure of the wet web to that temperature for about 2.4 seconds quickly caused solution of the polyvinyl alcohol.

The partially dry web then continued through an AER tunnel dryer, which was about 12 feet long by 6 feet wide, with a temperature setting of 450° F. and an actual temperature recorded at about 419° F. The web was then alternated in sequence over one and under the next of each of a series of six drier drums. The first drum provided a temperature of 235° F., which increased gradually towards the last drum, which had a temperature of about 270° F. The web was then continued through an Overly dryer maintained at a drying temperature of 475° F. The finished filter material leaving the Overly dryer (about 99 percent dry) was then contacted with another steam heated drum dryer and was then collected on a take up reel. The dry material had a smooth surface on each side and wound up easily on the reel without tearing or wrinkling.

The finished filter material exhibited heat resistence up to 750° F., efficiency for small particle filtration of about 40%, as determined by the DOP test, and a resistence to air flow of about 5.5 mm differential pressure. The finished material showed little loss of matrix character after burn-off as indicated by little change in filtration efficiency after burn-off. The material was sufficiently plasticized by residual diethylene glycol to permit folding or pleating without cracks or breakage.

While the various aspects of the present invention have been described and exemplified above in terms of certain preferred embodiments and applications, various other embodiments or applications may be apparent to those skilled in the art. For example, the high temperature filter material may be used as an interleaf element in annealing sheets of aluminum metal. Thus, sheets of the high temperature material may be inserted between individual sheets of aluminum in a stack before entering an annealing oven (at about 700° F. to 900° F.) in order to facilitate separation of the annealed aluminum sheets. The finished material may also be used as high temperature resistant electrical insulation, and low cost, high temperature insulation e.g. for ovens, piping and the like.

The invention is, therefore, not limited to the embodiments specifically described and exemplified, but is capable of variation and modification without departing from the spirit and scope of the appended claims.

I claim:

1. A composition useful as a component of a high temperature filter material, comprising a mixture of mica particles, a majority of said particles being of a size below 40 microns, and polymer micro-bits produced from an expanded, thermoplastic polymer selected from the group of a styrene polymer, a lower polyolefin which is the polymer of an ethylenically unsaturated hydrocarbon monomer having from 2 to 6 carbon atoms, or copolymers or blends of said polymers, each said polymer being non-brittle in expanded form, or produced from a flexible foamed polyurethane, said polymer micro-bits being substantially completely free of intact cells of the expanded or foamed polymer from which they are produced.

2. A composition as claimed in claim 1, wherein the polymer micro-bits are produced from expanded polystyrene.

3. A composition as claimed in claim 2, wherein the particle size distribution of the mica particles is substantially between 1 micron and about 40 microns.

4. A composition as claimed in claim 3, wherein the weight ratio of mica particles to polymer micro-bits is 15 to 1, or less.

5. A composition as claimed in claim 4, wherein the calculated surface area of said mica particles is from 0.40-0.60 m$^2$/cc.

6. A composition as claimed in claim 5, wherein the mica is pholgopite.

7. A composition as claimed in claim 3, which additionally includes up to about 15%, by weight, of polyvinyl alcohol.

8. A composition as claimed in claim 1, in the form of an aqueous slurry.

9. A composition as claimed in claim 3, in the form of an aqueous slurry.

10. A composition as claimed in claim 9, wherein said aqueous slurry includes a polyhydric alcohol or a polymer derivative of said alcohol, as a matrix plasticizer.

11. A composition as claimed in claim 10, wherein said aqueous slurry includes diethylene glycol.

12. A composition as claimed in claim 9, wherein said aqueous slurry includes a dispersion agent.

13. A composition as claimed in claim 12, wherein said dispersion agent is colloidal silica.

14. A process for preparing the composition of claim 1, which comprises comminuting mica particles, having an average particle size of 40 microns or greater, in the presence of said polymer micro-bits, so as to reduce the size of said mica particles, a majority of said particles being of a size below 40 microns.

15. A process as claimed in claim 14, wherein said polymer micro-bits are produced from expanded polystyrene.

16. A process as claimed in claim 15, wherein comminution is carried out in an aqueous medium.

17. A process as claimed in claim 16, wherein said aqueous medium includes a polyhydric alcohol or a polymer derivative thereof, as a plasticizer for said high temperature filter.

18. A process as claimed in claim 15, wherein said aqueous medium includes colloidal silica as a dispersion agent.

* * * * *